Patented Nov. 30, 1943

2,335,434

UNITED STATES PATENT OFFICE 2,335,434

EXTREME PRESSURE LUBRICANT

Glen H. Morey, Terre Haute, Ind., assignor to Commercial Solvents Corporation, Terre Haute, Ind., a corporation of Maryland No Drawing. Application June 16, 1941, Serial No. 398,240

6 Claims. (Cl. 252—54)

My invention relates to lubricating compositions suitable for use at high pressures. More particularly, it pertains to extreme pressure lubricating compositions comprising essentially a lubricating oil and a chlorohydroxy ketone.

In recent years the design of modern machinery has presented numerous problems in regard to the maintenance thereof. In many of such machines, the problem of furnishing adequate lubrication in various parts thereof which are subjected to extremely high pressures, has been of much importance. Such pressures, particularly when associated with high speed, tend to generate high temperatures under which the ordinary lubricants, after a short time, fail to maintain adequate lubrication between the moving parts. Some of the more important fields in which extreme pressure lubricants are necessary, are those involving the use of universal joints, and worm and hypoid gears in automobile transmissions and differentials. Also, this particular type of lubricant has found much use in the lubrication of crank shaft bearings in internal combustion engines. The fundamental problem encountered in the attempt to provide sufficient lubrication at high pressures, is the prevention of metal-to-metal contact when the pressure becomes so great between the metal surfaces that the film of oil is ruptured.

The theory in regard to the operation of extreme pressure addition agents in facilitating lubrication at high pressures, is not accurately understood. However, it appears that the function of such material in the common lubricant is dependent upon the adsorption of said material upon the metal surfaces or bearings, or other moving parts which it is intended to lubricate. The operation of these materials is apparently also dependent upon the chemical combination thereof with the metal under the influence of local high pressure and temperature, thereby forming a coating possessing a low coefficient of friction, and which is resistant to rupture under high operating pressure.

I have now discovered that highly satisfactory extreme pressure lubricants, which will adhere to metal surfaces and prevent metal-to-metal contact at high pressures in the absence of a film of oil, may be prepared by adding to a common oil lubricant a chlorohydroxy ketone of the type included by the following generic formula

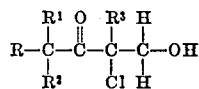

in which R represents hydrogen or chlorine, $R^1$ represents hydrogen, chlorine, or methyl, $R^2$ represents hydrogen, chlorine, or hydroxymethyl, and $R^3$ represents hydrogen, chlorine, or hydroxymethyl, the sum of the chlorine atoms present therein being less than five.

In accordance with my invention, the chlorohydroxy ketone may be added to the desired lubricant in amounts of from about 0.1 per cent by weight up to a concentration which is insufficient to substantially change the viscosity of the lubricant employed. For the majority of uses, however, I have found it preferable to employ the extreme pressure addition agents of my invention in amounts of from 0.1 per cent to 10 per cent by weight.

The efficiency of extreme pressure lubricants may be tested by means of various types of devices, one of which is the Faville-Levally machine, which is especially designed for determining the efficiency of lubricants at high pressures. Essentially this machine comprises a cylindrical steel pin mounted in such a manner as to be capable of rotating between two steel blocks possessing arc-like cavities which encircle the pin. Pressure may then be applied to each of these blocks, and such pressure is recorded on a gauge, which is usually capable of registering pressures of from 0 to 4500 pounds. This reading recorded is not in pounds per square inch, since the actual area of contact of the block with the pin is considerably less than one square inch. Therefore, the true pressure in pounds per square inch is substantially in excess of that which is recorded by the gauge. In addition to a means for recording the pressure in pounds, there is also a device to indicate the torque, which is a measure of the resistance to rotation of the pin between the metal blocks. During operation, the assembly of steel blocks and pin are immersed in the oil whose extreme pressure lubricating properties are to be tested.

The base oil which may be employed in preparing the extreme pressure lubricants of my invention is preferably a refined hydrocarbon lubricating oil of the character which will not readily decompose under conditions of extreme stress, such as high pressures and high temperatures. The mineral oil base may have incorporated therein such constituents as are usually employed for the purpose of improving its pour-point, etc., as well as constituents which are added to prevent oxidation and sludging. In general, the commercially available materials for these purposes will be found entirely compatible with the extreme pressure addition agents of the present invention.

As examples of the addition agents that are representative of those which are useful in preparing the extreme pressure lubricants of my invention there may be mentioned 3-chloro-4-hydroxy-2-butanone, 1 - chloro- 1,1 - bis(hydroxymethyl)-2-propanone, 3,3-dichloro-4-hydroxy-2- butanone, 1,3-dichloro-4-hydroxy-2-butanone, 1,3-dichloro-1,1-bis(hydroxymethyl)-2-propanone, 1,1,3-trichloro-1,3-dihydroxymethyl-2-propanone, 1,1,3-trichloro-1-hydroxymethyl-2-propanone, 2,2,4,4-tetrachloro-1,3-dihydroxymethyl-2-propanone, 1-chloro-1-hydroxymethyl-2-butanone, 1,1-dichloro-1-hydroxymethyl-2-butanone, 1,3-dichloro-1-hydroxymethyl-2-butanone, and the like. The above compounds may be produced in accordance with any suitable procedure. For example, these products are readily prepared by reacting with formaldehyde the desired chlorinated derivative of acetone, e. g., the symmetrical di- or tetra-chlorinated acetone, the formaldehyde preferably being present in the form of the customary 37–40 per cent aqueous solution, in the presence of a basic condensation catalyst, such as sodium hydroxide. The two reactants may be mixed without the aid of a solvent, but a mutual solvent may be employed, if desired. Likewise one of the reactions may be employed in the form of a solution in a solvent which serves as a mutual solvent for both reactants, or which may be a solvent for the reaction products. The molar ratios in which formaldehyde and the chloro ketone are reacted, will, of course, depend upon the extent to which it is desired to replace the active hydrogen atoms of the chloro ketone, with hydroxymethyl groups.

The following example is given in order to illustrate the effectiveness of the extreme pressure lubricants of my invention:

EXAMPLE

To a refined lubricating oil having an S. A. E. rating of 20, was added 0.1 per cent by weight of 3,3-dichloro-4-hydroxy-butanone. This blended oil was then subjected to extreme pressure lubrication tests on a Faville-Levally machine having a load limit of 4500 pounds. The results appearing below in tabular form demonstrate the advantages offered by the use of said 3,3-dichloro-4-hydroxy-2-butanone over ordinary hydrocarbon lubricating oils containing no extreme pressure addition agent, as well as over an extreme pressure lubricant which is representative of the type commercially available, the latter being added to a refined lubricating oil having an S. A. E. rating of 20, to the extent of 10 per cent by weight.

*Tests of lubricating oil (S. A. E. #20) plus 0.1% of 3,3-dichloro-4-hydroxy-2-butanone*

| Duration of test, minutes | Bearing load, pounds | Torque in pounds | |
|---|---|---|---|
| | | Start | Finish |
| 1 | 250 | 4 | 4 |
| 2 | 500 | 10 | 10 |
| 3 | 750 | 18 | 20 |
| 4 | 1,000 | 26 | 27 |
| 5 | 1,250 | 38 | 43 |
| 6 | 1,500 | 49 | ¹46 |
| 7 | 1,750 | 49 | 49 |
| 8 | 2,000 | 53 | 53 |
| 9 | 2,250 | 53 | 53 |
| 10 | 2,500 | 53 | 53 |
| 11 | 2,750 | 54 | 54 |
| 12 | 3,000 | 54 | 54 |
| 13 | 3,250 | 54 | 54 |
| 14 | 3,500 | 54 | 54 |
| 15 | 3,750 | 55 | 55 |
| 16 | 4,000 | 56 | 56 |
| 17 | 4,250 | 56 | 56 |
| 18 | 4,500 | 57 | 57 |

¹ Maximum reading 53.

*Tests of hydrocarbon oil (S. A. E. #20) containing no E. P. addition agent*

| Duration of test, minutes | Bearing load, pounds | Torque in pounds | |
|---|---|---|---|
| | | Start | Finish |
| 1 | 250 | 7 | 7 |
| 2 | 300 | 16 | (¹) |

¹ Failed.

*Tests of lubricating oil (S. A. E. #20) plus 10% E. P. additive commercially available*

| Duration of test, minutes | Bearing load, pounds | Torque in pounds | |
|---|---|---|---|
| | | Start | Finish |
| 1 | 250 | 6 | 6 |
| 2 | 500 | 12 | 12 |
| 3 | 750 | 18 | 18 |
| 4 | 1,000 | 22 | 20 |
| 5 | 1,250 | 24 | 25 |
| 6 | 1,500 | 40 | ¹98 |
| 7 | 1,750 | 104 | 103 |
| 8 | 2,000 | 105 | 104 |
| 9 | 2,250 | 105 | 105 |
| 10 | 2,500 | 105 | 105 |
| 11 | 2,750 | 105 | 105 |
| 12 | 3,000 | 104 | 104 |
| 13 | 3,250 | 105 | 105 |
| 14 | 3,500 | 115 | 119 |
| 15 | 3,750 | 123 | (²) |

¹ Maximum reading 123.
² Failed.

Additional comparative tests of lubricating oils containing commercially available extreme pressure lubricants and lubricating oils containing certain of the chlorohydroxy ketones of the present invention, are briefly summarized in the table which follows. The load limit of the Faville-Levally testing device employed in securing the data appearing below, was 1200 pounds.

| Compound | Oil base used in test | Per cent compound in base | Bearing load, pounds | Torque in pounds |
|---|---|---|---|---|
| 2-chloro-4-hydroxy-2-butanone | S. A. E. #20 | 1.0 | 1,200 | 33.5 |
| 1-chloro-1,1-bis-(hydroxymethyl)-2-propanone | S. A. E. #20 | 1.0 | 1,200 | 31.0 |
| E. P. lubricant A ¹ | | | 1,200 | 49 |
| E. P. lubricant B ¹ | | | 1,200 | 50 |

¹ Commercially available.

It will be seen from the tables appearing above that the chlorohydroxy ketones contemplated by the present invention, when blended with suitable lubricating oils in minor proportions, are effective to greatly improve the load-carrying capacity of such oils, and it is to be understood that while I have illustrated my invention with certain specific examples, the invention is not limited thereto. For instance, it is also within the contemplation of the present invention to provide the extreme pressure addition agents of the present invention in the form of a concentrate in a suitable oil, said oil containing rather high percentages of said additive. Such concentrates may be employed for further blending with a lubricating oil in the proportion desired for the particular conditions of use.

While a hydrocarbon oil generally is the principal ingredient of the lubricating compositions of my invention, it is not essential that it be the only ingredient other than the above extreme pressure addition agents, provided that there be no additional ingredient which is incompatible with said addition agents. For example, other ingredients, such as sodium soaps, lead soaps, aluminum stearate, etc., may also be added to lubricating compositions of the type described above, for the purpose of increasing the adhesion thereof to the metal surface under high pressure, thereby preventing unnecessary loss of the lubricant from bearings, gear cases, or the like.

My invention having now been described, what I claim is:

1. A lubricating composition comprising a hydrocarbon lubricant oil and a chlorohydroxy ketone, the latter being present in amount insufficient to affect the viscosity of said lubricant, and having the formula

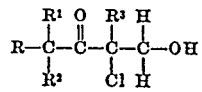

wherein R represents a member selected from the group consisting of hydrogen and chlorine, $R^1$ represents a member selected from the group consisting of hydrogen, methyl, and chlorine, $R^2$ represents a member selected from the group consisting of hydrogen, chlorine, and hydroxymethyl, and $R^3$ represents a member selected from the group consisting of hydrogen, chlorine, and hydroxymethyl, the sum of the chlorine atoms present in said ketone being less than five.

2. A lubricating composition comprising a hydrocarbon lubricant oil and a chlorohydroxy ketone, the latter being present in amounts from about 0.1 per cent to 10 per cent by weight, and having the formula

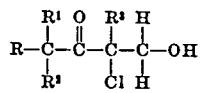

wherein R represents a member selected from the group consisting of hydrogen and chlorine, $R^1$ represents a member selected from the group consisting of hydrogen, methyl, and chlorine, $R^2$ represents a member selected from the group consisting of hydrogen, chlorine, and hydroxymethyl, and $R^3$ represents a member selected from the group consisting of hydrogen, chlorine, and hydroxymethyl, the sum of the chlorine atoms present in said ketone being less than five.

3. A lubricating composition comprising a hydrocarbon lubricant oil and 3,5-dichloro-4-hydroxy-2-butanone, the latter being present in amounts insufficient to affect the viscosity of said hydrocarbon lubricant oil.

4. A lubricating composition comprising a hydrocarbon lubricant oil and 3-chloro-4-hydroxy-2-butanone, the latter being present in amounts insufficient to affect the viscosity of said hydrocarbon lubricant oil.

5. A lubricating composition comprising a hydrocarbon lubricant oil and 1-chloro-1,1-bis (hydroxy-methyl)-2-propanone, the latter being present in amounts insufficient to affect the viscosity of said hydrocarbon lubricant oil.

6. As an extreme pressure addition agent for hydrocarbon lubricating oils, a chlorohydroxy ketone having the formula

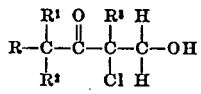

wherein R represents a member selected from the group consisting of hydrogen and chlorine, $R^1$ represents a member selected from the group consisting of hydrogen, methyl, and chlorine, $R^2$ represents a member selected from the group consisting of hydrogen, chlorine, and hydroxymethyl, and $R^3$ represents a member selected from the group consisting of hydrogen, chlorine, and hydroxy-methyl, the sum of the chlorine atoms present in said ketone being less than five.

GLEN H. MOREY.

CERTIFICATE OF CORRECTION.

Patent No. 2,335,434.  November 30, 1943.

GLEN H. MOREY.

It is hereby certified that error appears in the printed specification of the above numbered patent requiring correction as follows: Page 2, first column, line 37, for "hydroxy-butanone" read --hydroxy-2-butanone--; page 3, second column, line 10, claim 3, for "3,5-dichloro" read --3,3-dichloro--; and that the said Letters Patent should be read with this correction therein that the same may conform to the record of the case in the Patent Office.

Signed and sealed this 23rd day of May, A. D. 1944.

Leslie Frazer

(Seal)  Acting Commissioner of Patents.